(12) United States Patent
Earley et al.

(10) Patent No.: US 7,720,795 B2
(45) Date of Patent: May 18, 2010

(54) DIGITAL COCKPIT

(75) Inventors: Elizabeth Anne Earley, Springboro, OH (US); James Geoffrey Chirumbolo McKee, Cincinnati, OH (US); Kristin Sherwin Meyer, Cincinnati, OH (US); Michael Scott Godbey, Cincinnati, OH (US); Thomas Paul Brady, Lebanon, OH (US); Christopher Balfour Lorence, Mason, OH (US); David Andrew Rice, Mason, OH (US)

(73) Assignee: General Electric Company, Schenectady, NY (US)

( * ) Notice: Subject to any disclaimer, the term of this patent is extended or adjusted under 35 U.S.C. 154(b) by 1996 days.

(21) Appl. No.: 10/072,391

(22) Filed: Feb. 5, 2002

(65) Prior Publication Data

US 2003/0149682 A1    Aug. 7, 2003

(51) Int. Cl.
*G06F 17/00*    (2006.01)

(52) U.S. Cl. .................... 707/104.1; 707/101; 707/102; 707/103 R

(58) Field of Classification Search ............... 707/1–10, 707/100–104.1, 200–206
See application file for complete search history.

(56) References Cited

U.S. PATENT DOCUMENTS

| | | | |
|---|---|---|---|
| 6,128,624 A | 10/2000 | Papierniak et al. | |
| 6,151,601 A | 11/2000 | Papierniak et al. | |
| 6,154,766 A | 11/2000 | Yost et al. | |
| 6,157,967 A | 12/2000 | Horst et al. | |
| 6,163,774 A | 12/2000 | Lore et al. | |
| 6,167,396 A | 12/2000 | Lokken | |
| 6,173,310 B1 | 1/2001 | Yost et al. | |
| 6,212,524 B1 | 4/2001 | Weissman et al. | |
| 6,222,533 B1 | 4/2001 | Notani et al. | |
| 6,260,050 B1 | 7/2001 | Yost et al. | |
| 6,275,824 B1 | 8/2001 | O'Flaherty et al. | |
| 6,279,033 B1 | 8/2001 | Selvarajan et al. | |
| 6,289,352 B1 | 9/2001 | Proctor | |
| 6,308,168 B1 | 10/2001 | Dovich et al. | |
| 6,317,750 B1 | 11/2001 | Tortolani et al. | |
| 6,611,839 B1* | 8/2003 | Nwabueze | 707/101 |
| 2002/0178035 A1* | 11/2002 | Lajouanie | 705/7 |
| 2003/0071814 A1* | 4/2003 | Jou et al. | 725/37 |

* cited by examiner

*Primary Examiner*—Isaac M Woo
(74) *Attorney, Agent, or Firm*—William Scott Andes; Armstrong Teasdale LLP

(57) ABSTRACT

A method for communicating information for pre-defined metrics management of business metrics uses a system including a server and at least one user accessible device communicative with the server. The server has a database and a web interface. The method comprises providing a user with a web interface configurable to a template accommodating business metrics data by the user, and providing visual indications of the status of the business metrics.

11 Claims, 3 Drawing Sheets

DIGITAL COCKPIT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to methods and systems for communicating key business metrics within a business organization and more particularly to intranet-based systems and methods for monitoring business metrics, automatically updating such metrics, and generating alert notifications in the event certain metrics are above or below predefined criteria.

As used herein, the term "business metrics" means measurements of business-related activities and results. The metrics used by each business typically varies depending upon the nature and focus of the business. For example, a particular business may emphasize new product introductions and therefore define metrics related to product introduction processes. Other businesses may emphasize cost reduction activities on existing products and therefore define metrics related to cost reduction processes. Example business metrics include customer-centric metrics such as customer savings, on-time deliveries, and quality, core business metrics such as total revenue, variable costs, base costs, cash flow, and net income, and functional metrics such as metrics for sales, marketing, manufacturing, engineering, finance, environmental health and safety, and legal.

Such business metrics typically are reviewed by business leaders and others within a business organization on an hourly, daily, weekly, monthly, quarterly, and annual basis. Simply generating quantified values for each defined metric can be a time consuming and tedious task, especially for a large business organization with businesses located throughout the world. In addition, business reports typically are reported in paper form, and are delivered to designated business team members by manual internal mail or electronic mail. Consequently, the business team members typically do not have access to current information anytime and anywhere. That is, the team members typically must wait until a report has been generated and has been delivered in order to access such information.

BRIEF SUMMARY OF THE INVENTION

In one aspect of the invention, a method for processing business metrics information in a system including a server, and at least one user device and a database communicably coupled to the server is provided. The method comprises receiving operating and financial data for a business, processing the data to generate business metrics, comparing the business metrics to pre-defined parameters, and displaying a status of the business metrics.

In another aspect, a business metrics management system is provided. The management system comprises a computer, a server configured with a database enabled for storing and retrieving a web page interface, wherein the server is further configured to upload and store user input regarding business metrics in a database, a network communicative with the server and a user operated device connected to the network.

In a further aspect of the invention, a method for providing business management with business metrics is provided. The method comprises creating a business metric template which can accommodate business metrics data, entering business metrics data into the template, uploading the template into a database having enabled storage and retrieval capability for a business metric template, and providing the business metric template to business management.

In yet another aspect, an apparatus is provided. The apparatus comprises a computer, a server configured with a database enabled for storing and retrieving a template, the server additionally configured to upload and store business metrics data in a database, and a network communicative with the server and a user device connected to the network.

In a further aspect of the invention, an apparatus is provided. The apparatus comprises means for providing a web interface to a user, means for configuring the web interface to a template, means for entering business metrics data in the template, and means for storing and retrieving the template.

In another aspect, a computer-readable medium executable by a computer connected to a user device is provided. The computer-readable medium is for controlling the computer to receive a request to provide a web interface, provide a web interface configurable to a template, receive business metrics data in the template, and store the template.

DETAILED DESCRIPTION OF THE INVENTION

Systems and methods that for collecting, monitoring, and communicating business metrics to employees of a business are described herein. The systems and methods are not limited to the specific embodiments described herein. In addition, components of each system and each method can be practiced independently and separately from other components and methods described herein. Each component and method can be used in combination with other components and other methods.

Figure 1:
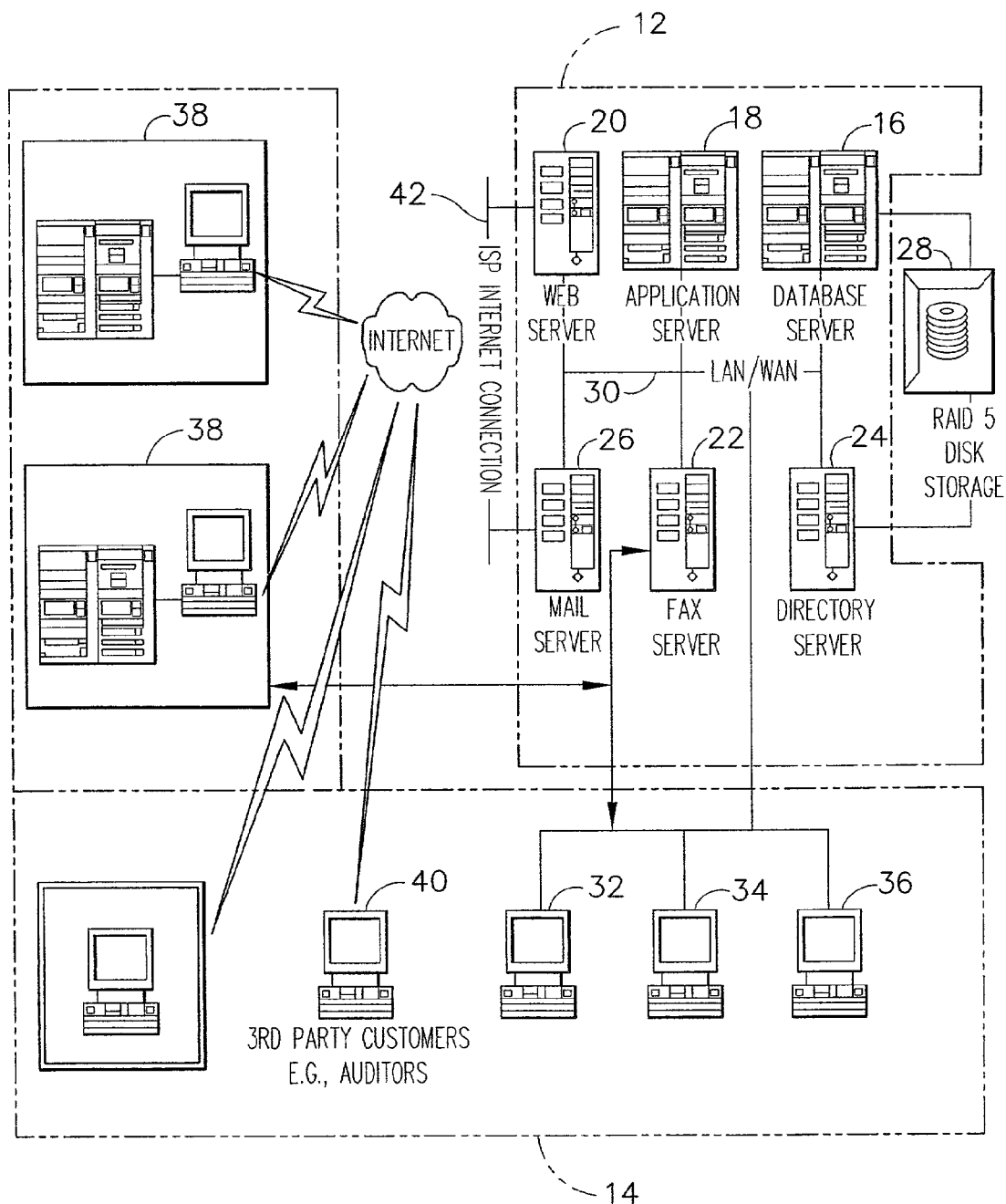
FIG. 1 is a system block diagram of an example system that can be utilized in connection with communicating business metrics the employees across all layers of a business.

FIG. 1 is a block diagram of an example embodiment of a server architecture of a digital cockpit system 10. System 10 includes a server system 12 and a client system 14. Server system 12 includes a database server 16, an application server 18, a web server 20, a fax server 22, a directory server 24, and a mail server 26. In an alternative embodiment, server system 12 does not include fax server 22. A disk storage unit 28 is coupled to database server 16 and director server 24. Servers 16, 18, 20, 22, 24, and 26 are coupled in a local area network (LAN) 30. In addition, a system administrator work station 32, a user work station 34, and a supervisor work station 36 are coupled to LAN 30. Alternatively, work stations 32, 34, and 36 are coupled to LAN 30 via an Internet link or are connected through an Intranet link.

Each work station 32, 34, and 36 is a personal computer including a web browser. Although the functions performed at the work stations typically are illustrated as being performed at respective work stations 32, 34, and 36, such functions can be performed at one of many personal computers coupled to LAN 30. Work stations 32, 34, and 36 are illustrated as being associated with separate functions only to facilitate an understanding of the different types of functions that can be performed by individuals having access to LAN 30.

Server system 12 is configured to be communicatively coupled to various server systems 38 and to third parties, e.g., internal or external auditors, 40 via an ISP Internet connection 42. Work stations 40 are personal computers including a web browser. Also, fax server 28 is illustrated as communicating with one of server system 38 via a telephone link. The communication in the example embodiment is illustrated as being performed via the Internet, however, any other wide area network (WAN) or local area network type communication can be utilized in other embodiments, i.e., the systems and processes are not limited to being practiced via the Internet. In addition, and rather than an Internet link, the link could be an Intranet link, or both an Internet link and an Intranet link can be provided.

Database server 16 stores frequently accessed information (i.e., status and meta-data) in a memory. System 10 retrieves the data from the database either at startup en masse or by request. System 10 also includes a refresh interval that is stored along with the data, and dictates to system 10 when a refresh of that information is necessary. More specifically, system 10 enables a user to view metrics including customer advocacy metrics and core business metrics. The refresh interval is set to the same frequency of the automated and non-automated, such that information will be continuously updated and synchronized across server system 12.

In the exemplary embodiment, system 10 provides accessing users an immediate understanding of a metric or a series of metrics through the display of a bulb that is either red, yellow, or green. Alternatively, the bulb may be an "ON/OFF" illuminator that provides a visual indication of the status of a metric. The display is provided via a cockpit that utilizes visual indicators. Selecting a bulb displayed on the cockpit provides additional details relevant to the metric represented by the bulb. For example, selecting a bulb may provide a user with bar charts, line charts, or data tables that are relevant to the metric selected. A message center is also provided which enables a user to post questions or comments to a person configured within the system as being the owner of a specific metric. Notification is provided to the owner of the metric whenever a message has been posted. In the exemplary embodiment, the notifications are done automatically through an e-mail system.

An individual responsible for the particular metric updates their metrics using one of three methods. First, the individual may use a Java® Server Page (JSP) that is only available to the individual for the their specific metrics. More specifically, the data and/or color of the gauges (not shown in FIG. 1) and the metrics data is updated through the JSP. Secondly, an administrator can use an administration functionality included within system 10 and update any metric they have pre-set administrative rights. Additionally, an administrator may utilize an application programming interface (API) and update system 10 by inputting the information as parameters.

In the exemplary embodiment, system 10 accumulates a variety of web-based data files concerning business information that is highly confidential or proprietary. Therefore, system 10 has different access levels to control and monitor the security of system 10. Authorization for access is assigned by system administrators on a need to know basis. More specifically, for end users, a lightweight directory access protocol (LDAP) attribute dictates what metrics users have access to, if any. Once system 10 is accessed, a user is then able to view all metrics to which they have been granted access.

Notifications are provided to a set of users based on pre-set criteria of the metrics. More generally, because some metrics are deemed more important than others, the notification feature enables users to be notified about changes in the metrics. There are two kinds of notification: regular and alert. Generally, the regular notifications are related to gauge color changes, escalations, declines, stale data, and custom built notifications. For example, when a pre-defined condition occurs, i.e, a status change from green to red, a regular notification may be sent to a list of defined recipients. The defined recipients, the time intervals, and the pre-defined conditions are defined within system 10. Stale data notifications, for example, may be defined to be emailed to addresses each evening when system 10 is updated. Telealert® notifications generally relate to application performance and availability issues, and are generally triggered when emergent pre-set threshold conditions are reached, exceeded, or shortfalls.

A user that has security rights to a metric, has access to the metric and any associated data drilldown. The user also has access to the message center, which is unique to each cockpit. More specifically, the user can not view any message from any other cockpit, and any messages visible by the user are dictated by whether or not that user has security access to see exported controlled information. Specifically, if a message contains export controlled information controlled information and that user is not authorized to see it (LDAP attributes dictate this) it is not displayed to them. Each message center is unique to each individual cockpit. The message center is accessed through a link contained on every metric. Following this link, a user may post a message about that specific metric in the post message section, and view any other messages on other metrics within the cockpit.

Users do not have access to the administration area, and rather, must be specifically granted access to such areas. Cockpit administrators have access rights to the administration pages. The content of the administration pages are unique to each cockpit, and as such, an administrator must be assigned to a particular cockpit to have access to it. They do no have access to the application administration area, but cockpit administrators can assign users to cockpits, and designate other cockpit administrators for their particular cockpit.

Application administrators have access to cockpit administration areas, as well as a specialized area designated especially for them. The specialized area enables an application administrator to designate anyone as an administrator of any cockpit. Furthermore, no user can bookmark a page within the cockpit. There is additional security in place within system 10 to ensure the administration pages cannot be accessed through direct or indirect methods without proper authentication.

Users wanting to create a new cockpit must also contact an Application administrator. The application administrator creates a cockpit "shell" or template, and assigns a user as a cockpit administrator. The cockpit administrator then uses the administration tools to create the groupings, metrics, notifications, and then add the users to the newly created cockpit. The cockpit administrator also establishes the data drilldown paths associated with the newly created cockpit. Such data may be encrypted, from an internal source, or from an external source.

Figure 2:
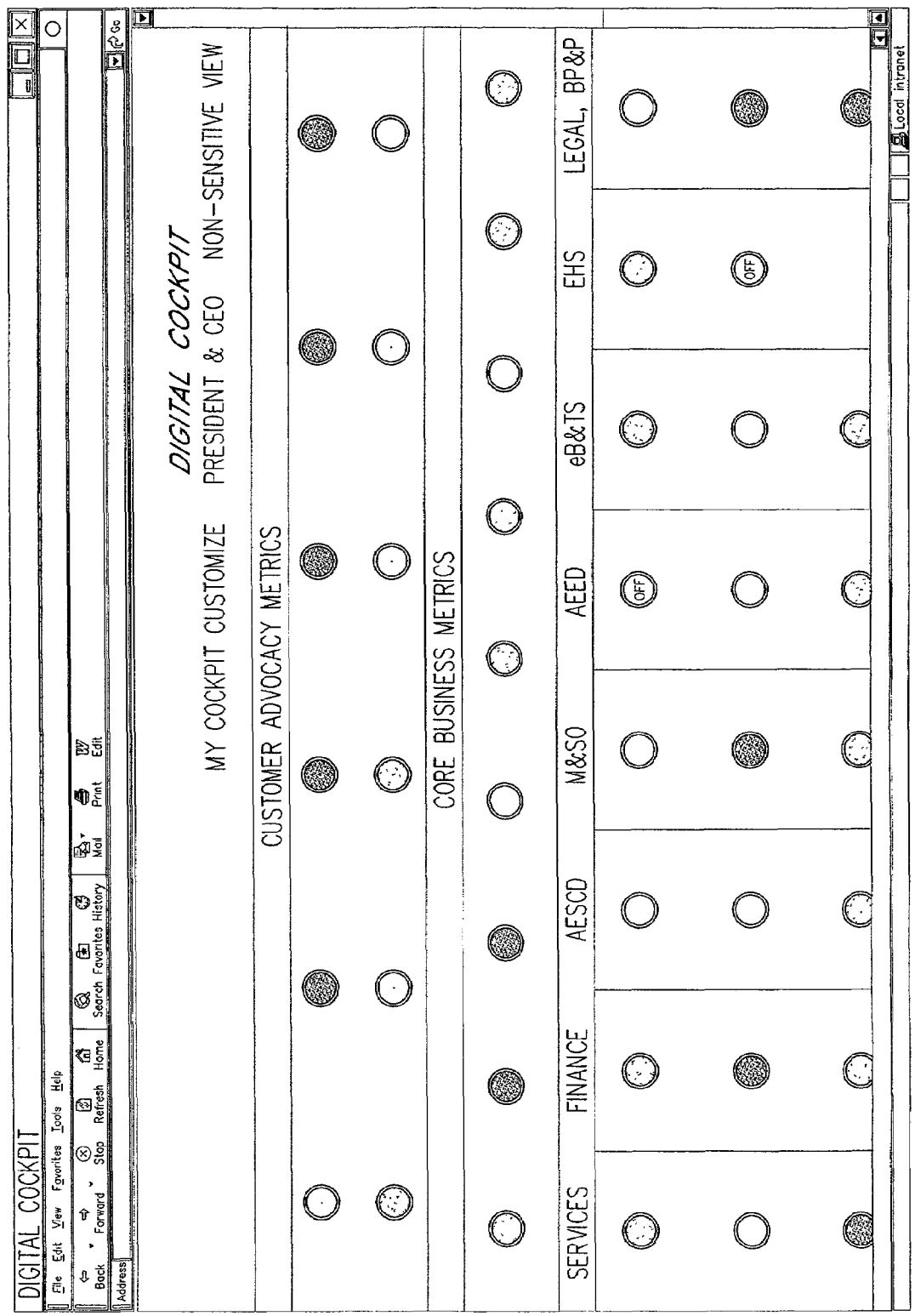
FIG. 2 is an example screen shot for communicating business metrics.

FIG. 2 is an example screen shot for communicating business metrics. As shown in the example in FIG. 2, the metrics displayed to the user include customer advocacy metrics and core business metrics. The metrics used by each business typically vary, as explained above. In addition, and within each business, the metrics desired to be viewed by individual employees may vary by utilizing "My Cockpit"® functionality.

Example customer advocacy business metrics include customer savings, on-time deliveries, and quality. Example core business metrics include total revenue, variable costs, base costs, cash flow, and net income, and functional metrics such as metrics for sales, marketing, manufacturing, engineering, finance, environmental health and safety, and legal.

As shown in FIG. 2, for each metric, a gauge is displayed. The gauge is a flat display of a colored dial or an on/off switch. In the example embodiment, the dial can be red, yellow, or green. If the dial is red, then this signals that the particular metric requires attention. For example, the measurements for that particular metric, or one key measurement for that metric, may not be within a pre-defined specification and therefore, follow-up and action are required. If the dial is green, then this means that the metric is within an acceptable range, although measurements are not necessarily out of a pre-defined range, such measurements may be approaching an out-of-range condition. If the dial is green, then this means that the metric is within range.

Gauges may be marked as restricted by a cockpit administrator, which prevents any other administrator from adding those gauges to their cockpit. Gauges may be marked as sensitive by the cockpit administrator, which will store all non-automated file data in the database encrypted with a Ceasar® cipher, as opposed to storing that information unencrypted on the file system.

Regardless of the metric state, by selecting the particular metric by selecting the respective dial (e.g., a mouse click), then a second level of information for the selected metric is displayed to the user. More specifically, system 10 is configured by providing the dashboard format with bulb colors or by defining dashboard switches as On/Off. System 10 programmatically provides a pre-configured number of cockpit formats that have different numbers of rows and columns to provide different formats for displaying the bulbs. The user defines the bulb color or switch position, and defines what data should be available for data drilldown for the lower level display below the bulb color. Such data is provided to system 10 in the form of a file to be displayed, or in the form of, but not limited to, other programs, systems, or software packages. Such data is displayed by system 10 when a user clicks on a bulb during usage.

Figure 3:
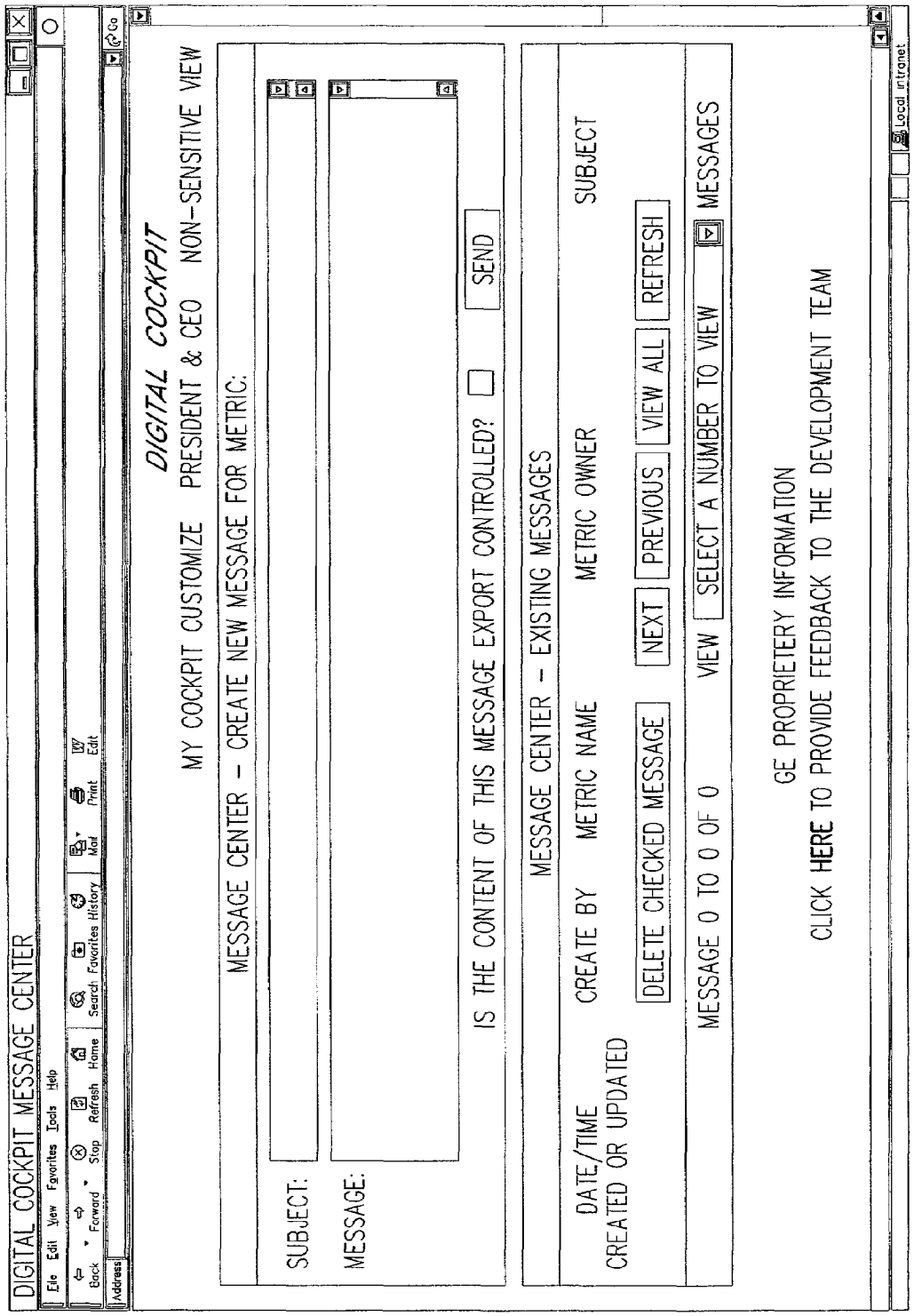
FIG. 3 is an example screen shot for a message center user interface.

FIG. 3 is an example screen shot for a message center user interface. Upon selection of a metric as described above, a user can then further select to transmit a message to the individual or team responsible for the particular metric. If the user selects to transmit a message, then the screen illustrated in FIG. 3 is displayed to the user. The user can then enter a subject and a message, and send the message to the appropriate team or individual for that particular metric.

A user that has security rights to a metric, has access to the metric and any associated data drilldown. The user also has access to the message center, which is unique to each cockpit. More specifically, the user can not view any message from any other cockpit, and any messages visible by the user are dictated by whether or not that user has security access to see exported controlled information. Specifically, if a message contains export controlled information controlled information and that user is not authorized to see it (LDAP attributes dictate this) it is not displayed to them. Each message center is unique to each individual cockpit. The message center is accessed through a link contained on every metric. Following this link, a user may post a message about that specific metric in the post message section, and view any other messages on other metrics within the cockpit.

While the invention has been described in terms of various specific embodiments, those skilled in the art will recognize that the invention can be practiced with modification within the spirit and scope of the claims.

What is claimed is:

1. A method for processing business metrics information in a system including a server, and at least one user device and a database communicatively coupled to the server, said method comprising:
   storing pre-defined users based on a business metric at the database, wherein the business metric is one of a customer-centric metric, a core business metric, and a business function metric, the customer-centric metric including one of customer savings, on-time deliveries, and quality; the core business metric including one of total revenue, variable costs, base costs, cash flow, and net income; and the business metric is relevant to at least one of sales, marketing, manufacturing, engineering, finance, environmental health and safety, and legal;
   receiving operating and financial data for a business;
   processing the operating and financial data to generate business metrics;
   comparing the business metrics to pre-defined parameters;
   notifying the pre-defined users when a pre-determined threshold regarding a respective business metric is satisfied; and
   displaying a status of the business metrics using a plurality of gauges for visually indicating a status of a respective business metric.

2. A method in accordance with claim 1 wherein displaying the business metrics further comprises displaying at least one gauge which visually indicates the position of a switch between an "ON" position and an "OFF" position.

3. A method in accordance with claim 1 further comprising displaying business data associated with each business metric.

4. A method in accordance with claim 3 wherein displaying business data associated with each business metric further comprises linking business data used in determining a status of each respective metric to each business metric.

5. A method in accordance with claim 3 wherein displaying business data associated with each business metric further comprises linking business data to each respective visual display.

6. A method in accordance with claim 1 wherein notifying users further comprises defining the pre-determined thresholds that trigger the notifications.

7. A method in accordance with claim 1 wherein notifying users further comprises defining which users receive the notifications when a predetermined threshold is satisfied.

8. A method in accordance with claim 1 further comprising coupling a message center to the server.

9. A method in accordance with claim 8 wherein coupling a message center further comprises receiving user inquiries regarding the business metric associated with the message center.

10. A method in accordance with claim 8 wherein coupling a message center further comprises receiving user input regarding the business metric associated with the message center.

11. A method in accordance with claim 1 further comprising restricting access to the server system.

* * * * *